(12) United States Patent
Fitzpatrick

(10) Patent No.: US 11,529,896 B2
(45) Date of Patent: Dec. 20, 2022

(54) SEAT BACK AND ADJUSTABLE PLATFORM ASSEMBLY

(71) Applicant: FAURECIA AUTOMOTIVE SEATING, LLC, Auburn Hills, MI (US)

(72) Inventor: Robert Fitzpatrick, Holland, MI (US)

(73) Assignee: FAURECIA AUTOMOTIVE SEATING, LLC, Auburn Hills, MI (US)

( * ) Notice: Subject to any disclaimer, the term of this patent is extended or adjusted under 35 U.S.C. 154(b) by 0 days.

(21) Appl. No.: 17/198,516

(22) Filed: Mar. 11, 2021

(65) Prior Publication Data

US 2022/0289084 A1    Sep. 15, 2022

(51) Int. Cl.
| | |
|---|---|
| *B60N 2/36* | (2006.01) |
| *B60N 3/00* | (2006.01) |
| *B60R 7/04* | (2006.01) |

(52) U.S. Cl.
CPC .............. *B60N 2/366* (2013.01); *B60N 3/001* (2013.01); *B60R 7/043* (2013.01)

(58) Field of Classification Search
CPC ............ B60N 2/366; B60N 2/36; B60N 2/32; B60N 2/24; B60N 3/001; B60R 7/043
USPC ........................................................ 297/126
See application file for complete search history.

(56) References Cited

U.S. PATENT DOCUMENTS

| | | | | | |
|---|---|---|---|---|---|
| 4,536,027 | A | * | 8/1985 | Brennan ................. | B64D 11/06 297/124 |
| 4,932,718 | A | * | 6/1990 | Yamazaki .............. | A47C 13/00 297/146 |
| 5,322,344 | A | * | 6/1994 | Hoffman ................. | A47C 17/86 297/188.04 |
| 5,524,959 | A | * | 6/1996 | Scott ......................... | A47C 7/68 297/125 |
| 5,842,743 | A | * | 12/1998 | Wright ................... | A47C 17/04 297/378.1 |
| 6,059,358 | A | * | 5/2000 | Demick .................. | B60R 11/00 297/125 |
| 6,220,660 | B1 | * | 4/2001 | Bedro ...................... | B60N 2/79 297/188.04 |
| 7,562,931 | B2 | * | 7/2009 | Stojanovic ............... | B60N 2/36 296/37.16 |
| 7,607,726 | B2 | * | 10/2009 | Orlo ....................... | B60N 3/004 248/421 |
| 7,770,966 | B2 | * | 8/2010 | Johnson ............. | B64D 11/0638 297/122 |
| 9,290,112 | B2 | * | 3/2016 | Rouxel .................. | B60N 2/206 |

(Continued)

FOREIGN PATENT DOCUMENTS

| | | |
|---|---|---|
| CN | 202294398 U | 7/2012 |
| EP | 0943485 A2 | 9/1999 |

(Continued)

*Primary Examiner* — Mark R Wendell

(74) *Attorney, Agent, or Firm* — Carlson, Gaskey & Olds, P.C.

(57) ABSTRACT

A method and an apparatus, according to an exemplary aspect of the present disclosure includes, among other things, a seat back movable between an upright position and a folded position, and a platform coupled to the seat back with a support mechanism such that the platform is movable between a plurality of use positions when the seat back is in the folded position. The support mechanism includes at least one member that is selectively detached from the platform to provide at least one of the plurality of use positions.

21 Claims, 3 Drawing Sheets

(56) References Cited

U.S. PATENT DOCUMENTS

| | | | | |
|---|---|---|---|---|
| 10,160,363 B2* | 12/2018 | Aguilar Ruelas | ........ | B60N 2/90 |
| 10,232,747 B2* | 3/2019 | Line | ......... | B60N 2/32 |
| 10,457,171 B2* | 10/2019 | Line | ........ | B60R 11/0252 |
| 10,632,933 B2* | 4/2020 | Line | ......... | B60N 2/206 |
| 2002/0060481 A1* | 5/2002 | Jones | ......... | B60N 2/206 |
| | | | | 297/188.04 |
| 2004/0099186 A1* | 5/2004 | Wojcik | ......... | B60N 2/206 |
| | | | | 108/44 |
| 2007/0126273 A1* | 6/2007 | Jasinski, II | ......... | B60N 3/004 |
| | | | | 297/378.1 |
| 2008/0238169 A1* | 10/2008 | Hicks | ......... | B60N 3/08 |
| | | | | 297/353 |
| 2019/0031114 A1* | 1/2019 | Line | ......... | B60N 2/01 |
| 2019/0225338 A1* | 7/2019 | Pozzi | ......... | B64D 11/00152 |
| 2020/0017220 A1 | 1/2020 | Wanner et al. | | |

FOREIGN PATENT DOCUMENTS

| | | |
|---|---|---|
| FR | 2916393 A1 | 11/2008 |
| FR | 3008935 A1 | 1/2015 |
| GB | 2113540 B | 7/1985 |

\* cited by examiner

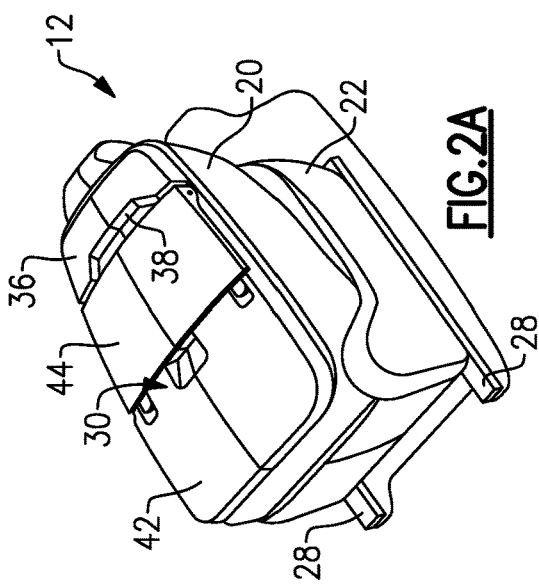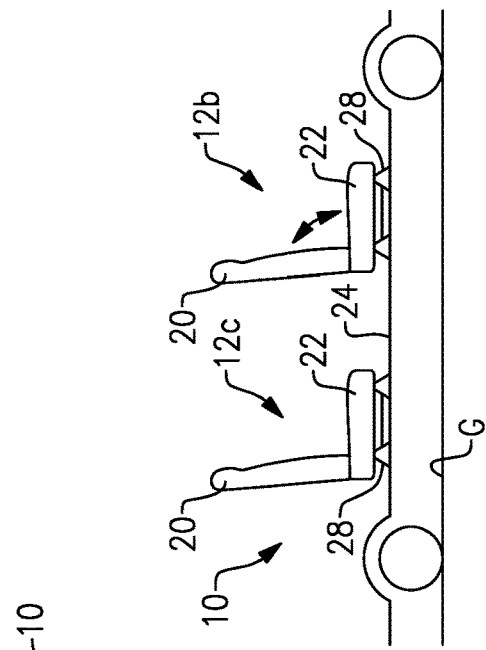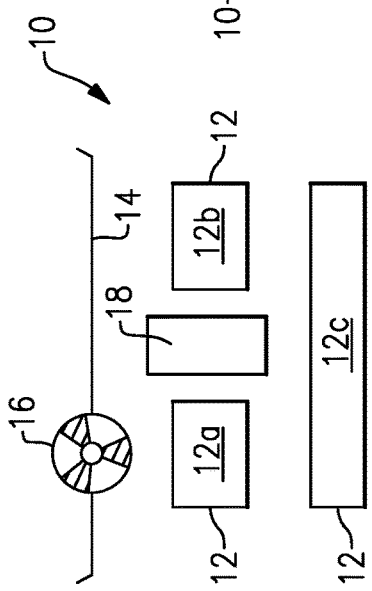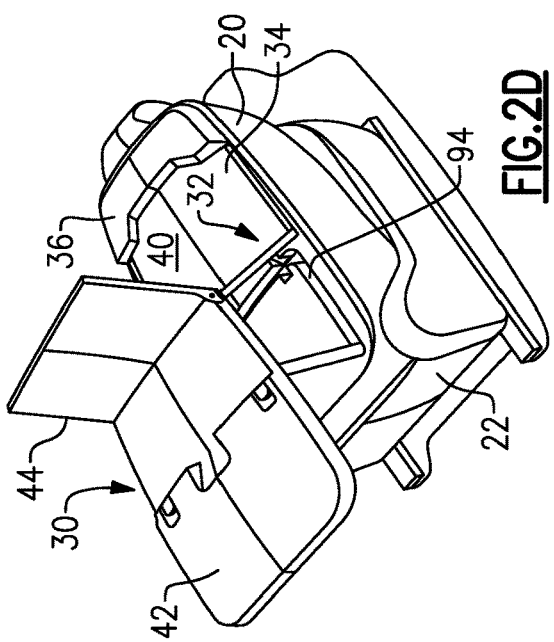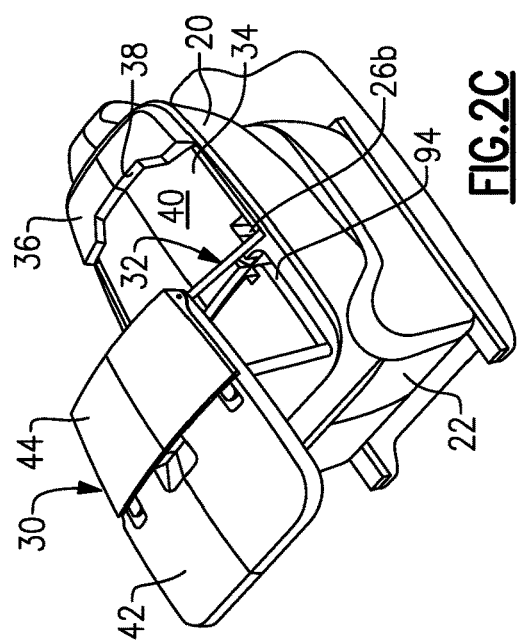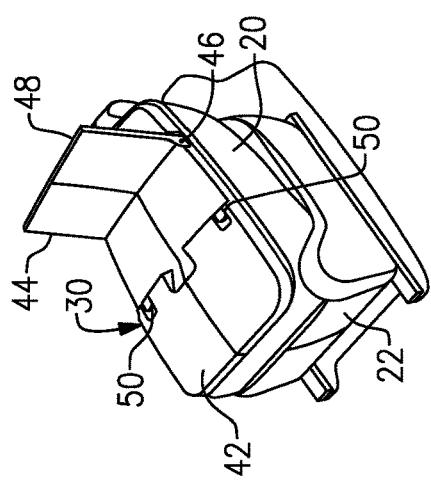

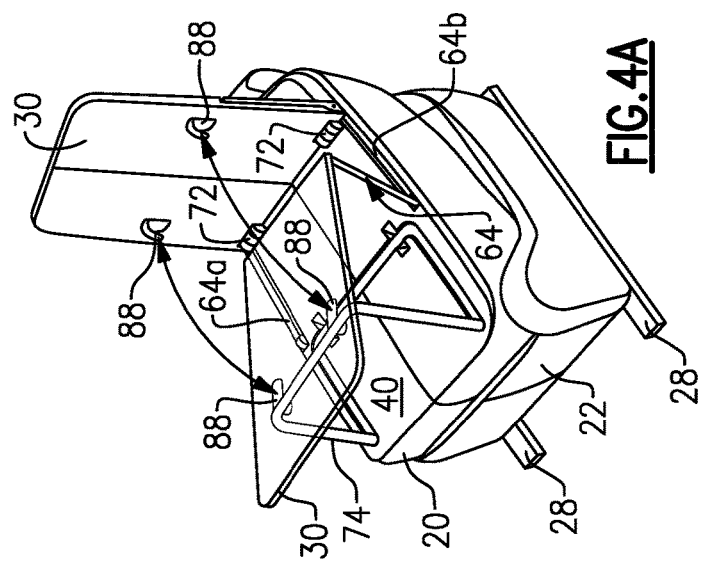
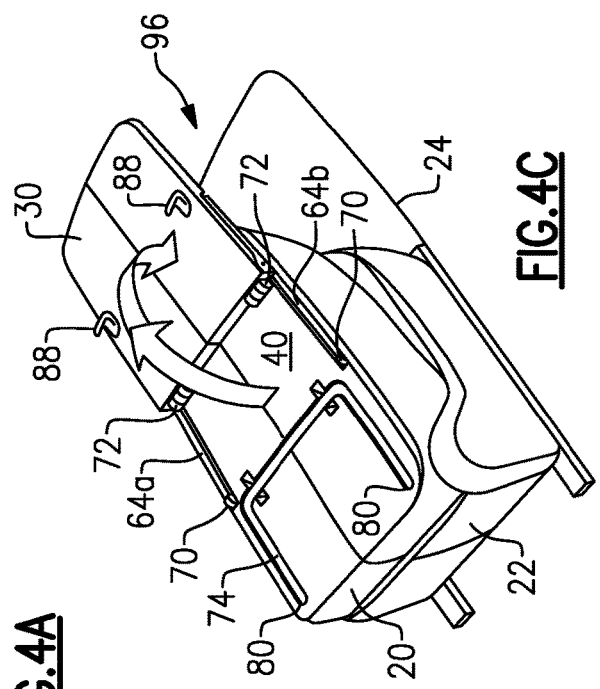
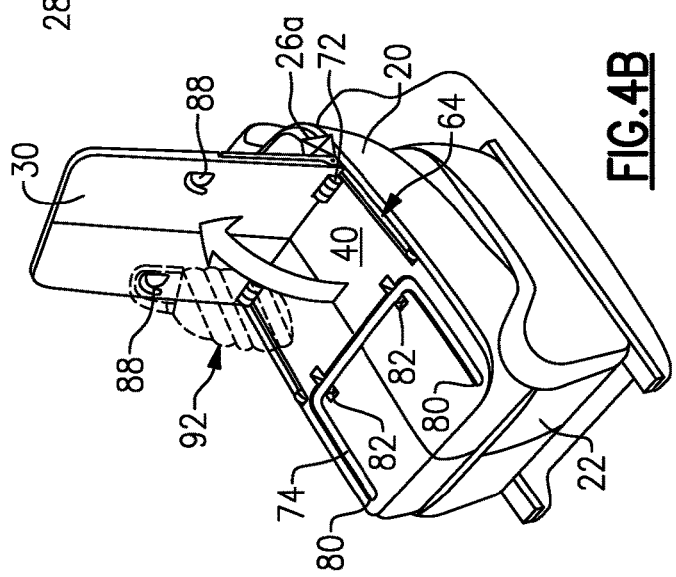

SEAT BACK AND ADJUSTABLE PLATFORM ASSEMBLY

TECHNICAL FIELD

This disclosure relates generally to a vehicle seat that includes an adjustable platform assembly. More particularly, this disclosure relates to a platform coupled to a seat back with a support mechanism. The platform is movable between a plurality of use positions when the seat back is in a folded position.

BACKGROUND

Passengers are requiring more flexibility with regard to useful space within a vehicle. Providing additional storage or a workspace in a passenger compartment can be challenging. Depending on varying vehicle seat configurations, available space for providing a useful work surface can be limited. Solutions to improving and increasing such space are continuously sought after.

SUMMARY

An apparatus according to an exemplary aspect of the present disclosure includes, among other things, a seat back movable between an upright position and a folded position, and a platform coupled to the seat back with a support mechanism such that the platform is movable between a plurality of use positions when the seat back is in the folded position. The support mechanism includes at least one member that is selectively detached from the platform to provide at least one of the plurality of use positions.

In a further non-limiting embodiment of the foregoing apparatus, the plurality of use positions includes at least a stowed position, a table position, and an upright position.

In a further non-limiting embodiment of any of the foregoing apparatus, the at least one member is detached from the platform when in the upright position.

In a further non-limiting embodiment of any of the foregoing apparatus, the seat back provides a seat back surface that is generally parallel to ground level when in the folded position, and wherein the platform is generally parallel to and fitted against the seat back surface when in the stowed position, the platform is generally parallel to and spaced apart from the seat back surface when in the table position, and the platform is oriented at a non-zero angle relative to the seat back surface when in the upright position.

In a further non-limiting embodiment of any of the foregoing apparatus, the platform includes at least a base portion and a flippable portion that pivots relative to the base portion, and wherein the plurality of use positions additionally includes at least a flip-up position where the flippable portion is pivoted upright relative to the base portion to provide a support stand.

In a further non-limiting embodiment of any of the foregoing apparatus, the flippable portion is selectively movable to the flip-up position at least when the seat is in the stowed or table position.

In a further non-limiting embodiment of any of the foregoing apparatus, the plurality of use positions additionally includes at least an extended storage position, wherein the at least one member is detached from the platform and the platform is pivoted beyond the upright position to the extended storage position.

In a further non-limiting embodiment of any of the foregoing apparatus, the platform includes a first surface facing the seat back surface and a second surface opposite the first surface, and including at least one latch member on the first surface that selectively couples the at least one member to the platform.

In a further non-limiting embodiment of any of the foregoing apparatus, the at least one latch member is configured to additionally provide a retaining feature that can hold a bag or secure a moveable object when the platform is in the upright position.

In a further non-limiting embodiment of any of the foregoing apparatus, the support mechanism includes a first bar linkage that has one end pivotally connected to the seat back and an opposite end pivotally connected to the platform, and a second bar linkage that is separate from the first bar linkage, and has one end pivotally connected to the seat back and another end pivotally and detachably connected to the platform to comprise the at least one member that is detachable from the platform.

In a further non-limiting embodiment of any of the foregoing apparatus, the second bar linkage comprises a single bar having a U-shape or a C-shape.

A method according to still another exemplary aspect of the present disclosure includes, among other things, providing a seat back movable between an upright position and a folded position; coupling a platform to the seat back with a support mechanism such that the platform is movable between a plurality of use positions when the seat back is in the folded position; and selectively detaching at least one member of the support mechanism from the platform to provide at least one of the plurality of use positions.

In a further non-limiting embodiment of the foregoing method, the support mechanism includes a first bar linkage and a second bar linkage that is separate from the first bar linkage, and the method further includes pivotally connecting one end of the first bar linkage to the seat back and pivotally connecting an opposite end of the first bar linkage to the platform, and pivotally connecting one end of the second bar linkage to the seat back and pivotally and detachably connecting an opposite end of the second bar linkage to the platform to comprise the at least one member that is detachable from the platform.

In a further non-limiting embodiment of any of the foregoing methods, the seat back provides a seat back surface that is generally parallel to ground level when in the folded position, and wherein the plurality of use positions includes at least a stowed position, a table position, and an upright position, and the method further includes fitting the platform against the seat back surface when in the stowed position such that the platform is generally parallel to the seat back surface, raising the platform away from the seat back surface when in the folded position such that the platform is generally parallel to and spaced apart from the seat back surface when in the table position, and pivoting the platform relative to the seat back surface and detaching the at least one member from the platform such that the platform is oriented at a non-zero angle relative to the seat back surface when in the upright position.

In a further non-limiting embodiment of any of the foregoing methods, the platform includes at least a base portion and a flippable portion that pivots relative to the base portion, and wherein the plurality of use positions additionally includes at least a flip-up position and/or an extended storage position, and the method further includes pivoting the flippable portion upright relative to the base portion to provide a support stand and achieve the flip-up position when in the stowed or table position, and/or detaching the at least one member from the platform and pivoting the platform beyond the upright position to the extended storage position.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows:

FIG. 1A is a schematic representation of a vehicle with one example of a seating configuration;

FIG. 1B is a schematic representation of vehicle seats from FIG. 1A in an upright position;

FIG. 2A is a perspective view of a vehicle seat in a folded position, and which includes an adjustable platform that is in a stowed position;

FIG. 2B shows the seat of 2A in a flip-up position while the vehicle seat is folded and the adjustable platform is stowed;

FIG. 2C shows the seat of 2A in a table position that provides a work surface;

FIG. 2D shows the seat of 2A in a flip-up position while the vehicle seat is folded and the platform is in the table position;

FIG. 4A shows the seat of FIG. 2A with a support mechanism that includes at least one member that is selectively detached from the platform to provide an upright use position;

FIG. 4B shows the seat of FIG. 4A with the platform in the upright position while the vehicle seat is folded and with the detachable member of the support mechanism stowed; and FIG. 4C is a view similar to FIG. 4B but shows the platform in an extended storage position where the platform is pivoted beyond the upright position to the extended storage position.

DETAILED DESCRIPTION

Figure 3:
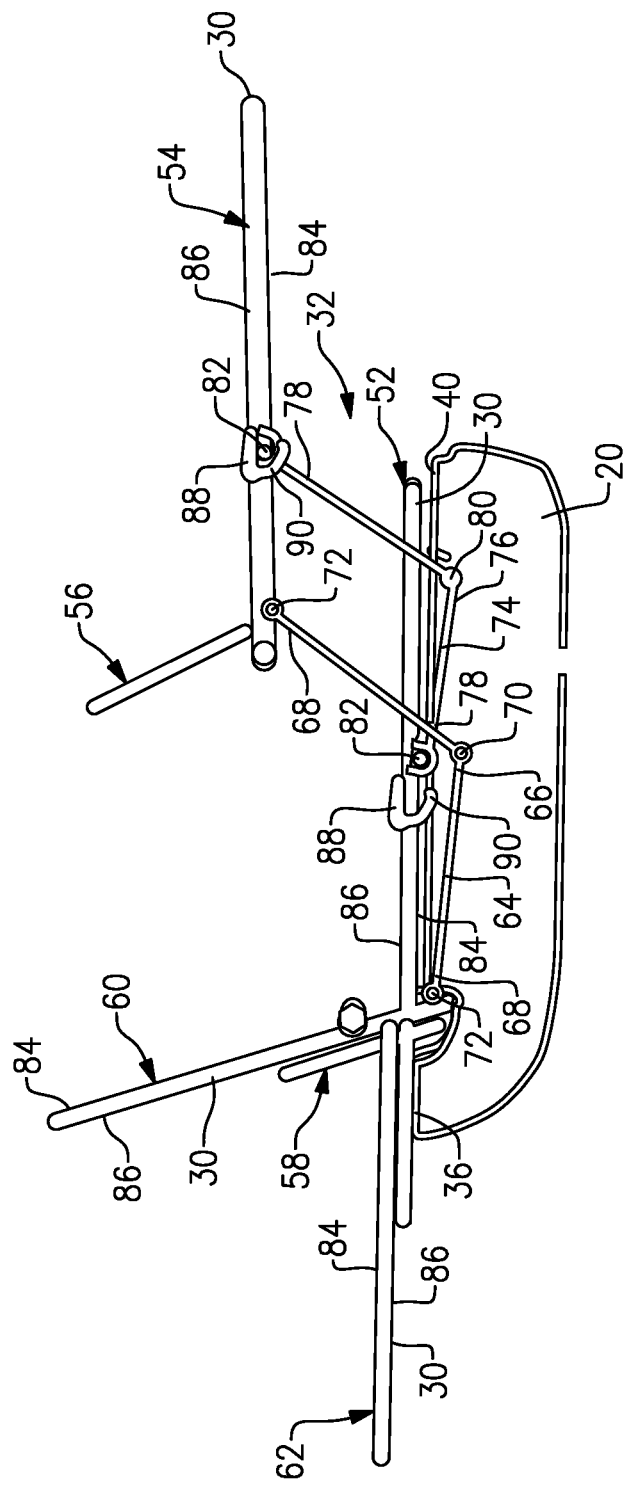
FIG. 3 is a side schematic view of the seat of FIG. 2A with the platform shown in a plurality of different use positions.

This disclosure details an exemplary vehicle seat that includes an adjustable platform assembly. In one example, the disclosure details a platform coupled to a seat back with a support mechanism such that the platform is movable between a plurality of use positions when the seat back is in the folded position, and wherein the support mechanism includes at least one member that is selectively detached from the platform to provide at least one of the plurality of use positions.

FIG. 1A shows a vehicle 10 with a plurality of seats 12 in one example seating configuration. An instrument panel 14 supports a steering wheel 16 on a driver's side of the vehicle. A center console 18 separates a driver seat 12a from a front passenger seat 12b. The vehicle 10 also includes a rear passenger seat 12c that is behind the driver and passenger seats, 12a and 12b, respectively. In the example shown, the rear passenger seat 12c is a bench seat; however, two separate rear seats could also be provided. Additional rows of rear seating could additionally be provided behind the rear passenger seat 12c depending on the vehicle configuration.

The vehicle seats 12 are moveable between an upright position (FIG. 1B) and a folded position (FIG. 2A). FIG. 1B shows the front passenger seat 12b and the rear passenger seat 12c both in the upright position. Each seat 12 has a seat back 20 and a seat cushion 22 that is mounted via a seat track 28 to a vehicle floor 24.

FIG. 2A shows an example of the front passenger seat 12b where the seat back 20 is folded down on top of the seat cushion 22 to provide the folded position. A platform 30 is coupled to the seat back 20 with a support mechanism 32 such that the platform 30 is movable between a plurality of use positions when the seat back 20 is in the folded position. The support mechanism 32 includes at least one member that is selectively detached from the platform 30 to provide at least one of the plurality of use positions.

In one example, the plurality of use positions for the platform 30 includes at least a stowed position (FIG. 2A), a table position (FIG. 2C), and an upright position (FIG. 4B). Additional use positions include a flip-up position (FIGS. 2B and 2D) and an extended storage position (FIG. 4C). Each of these positions is only provided when the seat back 20 is folded on the seat cushion 22. By having the seat 12 in the folded position, the amount of available workspace and/or storage space is significantly increased.

As shown in one example in FIG. 2C, the seat back 20 includes a recessed area 34 that receives the platform 30 and the support mechanism 32 when stowed. An outermost surface portion 36 of the seat back 20 transitions to the recessed area via a wall 38. When the platform 30 is positioned in the recessed area 34, the seat back 20 and platform 30 provide for a generally flat surface.

The seat back 20 provides a seat back surface 40 that is generally parallel to ground level G (FIG. 1B) when the seat 12 is in the folded position. The seat back surface 40 comprises the seat surface of the recessed area 34. The platform 30 is generally parallel to and fitted against the seat back surface 40 within the recessed area 34 when in the stowed position as shown in FIG. 2A. As such, the platform 30 is generally flush with the outermost surface portion 36 of the seat back 20 when the platform 30 is in the stowed position. This prevents the platform 30 from protruding into rear passenger areas when the seat 12 is in the upright position.

The platform 30 is generally parallel to and spaced apart from the seat back surface 40 when in the table position as shown in FIG. 2C. As the platform 30 is pivoted to the table position, the platform 30 extends slightly rearward of an end of the folded seat back 20. This provides a work surface for a rear passenger. The platform 30 is oriented at a non-zero angle relative to the seat back surface 40 when in the upright position as shown in FIG. 4B. The platform 30 can be perpendicular to, or obliquely oriented to, the folded seat back 20 when in the upright position.

A stop or locking adjustment feature 26a, shown schematically in FIG. 4B, can be used to hold the platform at a desired angle relative to the seat back 20. A stop or locking adjustment feature 26b, shown schematically in FIG. 2C, could also be included to position the platform 30 at different heights because by nature of the linkages of the support mechanism 32, the platform always stays horizontal. The stop or lock locking adjustment features 26a, 26b could be friction or mechanical with break away, for example.

In one example, the platform 30 includes at least a base portion 42 and a flippable portion 44 that pivots relative to the base portion 42. The flippable portion 44 includes a pivot connection 46 at one edge and an opposite edge 48 is selectively moveable between a stowed position (FIG. 2A and FIG. 2C) and a flip-up position (FIGS. 2B and 2D). The base portion 42 and the flippable portion 44 are generally flush with each other when in the stowed position such that the platform 30 provides a flat workspace area when in the table position (FIG. 2C). The flippable portion 44 is perpendicular to, or at a non-zero angle with, the base portion 42 when in the flip-up position. The platform 30 includes locks or latches 50 that secure the flippable portion 44 to the base portion 42. Any type of locking or latching mechanism can be used for securement, such as a push-button, a rotating mechanism, or a sliding mechanism, for example. To provide the flip-up position, the flippable portion 44 is pivoted upright via the pivot connection 46 relative to the base portion 42 to provide a support stand for book, magazine, or an electronic device (tablet, phone, pad, etc.) for example. The flippable portion 44 is selectively movable to the flip-up position at least when the seat 12 is in the stowed (FIG. 2B) or table position (FIG. 2D). The pivot connection 46 is configured such that the flippable portion 44 can be held at a fixed position when in the flip-up position.

The support mechanism 32 for the platform 30 is shown in greater detail in FIG. 3. The platform 30 is shown in the stowed position at 52, in the table position at 54, in the flip-up position as shown at 56 (table position) and at 58 (stowed position), in the upright position at 60, and in the extended storage position at 62. As discussed above, the support mechanism 32 includes at least one member that is selectively detached from the platform 30 to provide at least one of the plurality of use positions. In one example, the at least one member is detached from the platform 30 to provide the upright position 60.

In one example, the support mechanism 32 includes a first bar linkage assembly 64 that has a first end 66 pivotally connected to the seat back 20 and an opposite second end 68 pivotally connected to the platform 30. The first end 66 has a pivot connection 70 to the seat back 20 and the second end 68 has a pivot connection 72 to the platform 30. The pivot connections 70, 72 can comprise a hinge or any other type of pivoting mechanism, and these connections are non-detachable connections. In one example, the first bar linkage assembly 64 has first and second arms 64a, 64b (FIG. 4A) that are each attached to the platform 30 with a pivot connection 72 and are each attached to the seat back 20 with a pivot connection 70. Optionally, a single U-shaped or C-shaped bar could be used.

The support mechanism 32 also includes a second bar linkage assembly 74 that is separate from the first bar linkage 64. The second bar linkage assembly 74 has a first end 76 pivotally connected to the seat back 20 and an opposite second end 78 pivotally and detachably connected to the platform 30 to comprise the at least one member that is detached from the platform 30. The first end 76 has a pivot connection 80 to the seat back 20 and the second end 78 has a pivot connection 82 to the platform 30. The pivot connections 80, 82 can comprise a hinge or any other type of pivoting mechanism. The pivot connection 80 is a non-detachable connection, while the pivot connection 82 is a selectively detachable connection.

In one example, the platform 30 includes a first surface 84 facing the seat back surface 40 and a second surface 86 opposite the first surface 84. The second surface 86 comprises a work surface area, when the platform 30 is in the stowed 52 or table 54 position, and encompasses the base portion 42 and the flippable portion 44. The first surface 84 comprises a work surface or support surface when the platform 30 is in the upright 60 or extended storage 62 position. One or more lock or latch members 88 are provided on the first surface 84 that selectively couple the second bar linkage assembly 74 to the platform 30. Any type of lock or latch member 88 can be used to selectively couple the second bar linkage assembly 74 to the platform 30. For example, the lock or latch member 88 can be a resilient gripper where a bar body of the second bar linkage assembly 74 is pressed into and pulled out of the gripper. In one example, the gripper includes at least one arm 90 that flexes outwardly from an initial position when the bar body is pressed into an opening between the arm 90 and the platform 30, and then returns to the initial position once the bar body is fully received within the opening to securely hold the bar body to the platform 30. The reverse process would occur when the bar body is pulled out of the opening to detach the second bar linkage assembly 74 from the platform 30.

In one example, the second bar linkage assembly 74 comprises a single bar having a U-shape or a C-shape (FIGS. 4A-4C). Optionally, two separate bars could be separately coupled to the platform; however, the one bar configuration could be detached with a single operation as opposed to two separate operations for two bars.

In one example, the at least one lock or latch member 88 is configured to additionally provide a retaining feature that can hold a bag or secure a moveable object (shown schematically at 92) when the platform 30 is in the upright position as shown in FIG. 4B. Handles of a bag or other types of items can be retained within, or hung over, the grippers, for example. The upright position 60 can also provide an increased storage area for items such as suitcases, boxes, sports equipment, etc. In this position, the second bar linkage assembly 74 is folded to a stowed position within the seat back 20. A channel or groove 94 (FIG. 2D) can be provided within the seat back 20 to receive the second bar linkage assembly 74 in the stowed position such that the second bar linkage assembly 74 is generally flush with the seat back surface 40.

As shown in 4C, the plurality of use positions additionally includes an extended storage position where the second bar linkage assembly 74 is detached from the platform 30, and the platform 30 is pivoted beyond the upright position 60 to the extended storage position 62. The platform 30 in this position is generally parallel to ground level G. The extended storage position provides at least two additional beneficial features. First, the flat surface is extended forward of the seat 12 to provide a longer support surface than is provided when the platform 30 is in the stowed position. This allows longer items such as skis, golf clubs, building materials, etc. to be placed within the vehicle 10. Second, a hidden storage area 96 is provided underneath the extended platform 30 between the vehicle floor 24 and the platform 30 and within the passenger footwell area. This allows items to be placed within the hidden storage area 96 such that the items cannot be viewed from outside the vehicle 10.

A method is also disclosed for moving the platform 30 between a plurality of different use positions. A seat back 20 is provided that is movable between an upright position (FIG. 1B) and a folded position (FIG. 2A). The method further includes coupling the platform 30 to the seat back 20 with the support mechanism 32 such that the platform 30 is movable between the plurality of use positions when the seat back 20 is in the folded position, and selectively detaching at least one member of the support mechanism 32 from the platform 30 to provide at least one of the plurality of use positions. The support mechanism 32 includes the first bar linkage 64 and the second bar linkage 74 which is separate from the first bar linkage 64, i.e. the linkage bars are not attached or connected to each other.

Additional steps include: pivotally connecting one end of the first bar linkage 64 to the seat back 20 and pivotally connecting an opposite end of the first bar linkage 64 to the platform 30, and pivotally connecting one end of the second bar linkage 74 to the seat back 20 and pivotally and detachably connecting an opposite end of the second bar linkage 74 to the platform 30 to comprise the at least one member that is detachable from the platform 30.

Moving between the plurality of use positions includes the steps of: fitting the platform 30 against the seat back surface 40 when in the stowed position such that the platform 30 is generally parallel to the seat back surface 40, raising the platform 30 away from the seat back surface 40 when in the folded position such that the platform 30 is generally parallel to and spaced apart from the seat back surface 40 when in the table position, and pivoting the platform 30 relative to the seat back surface 40 and detaching the second bar 74 from the platform 30 such that the platform 30 is oriented at a non-zero angle relative to the seat back surface 40 when in the upright position, pivoting the flippable portion 44 upright relative to the base portion 42 to provide a support stand and achieve the flip-up position when in the stowed or table position, and/or detaching the second bar 74 from the platform 30 and pivoting the platform 30 beyond the upright position to the extended storage position.

The subject disclosure provides for a multipurpose tray or platform that is coupled to a seat back and is adjustable between use positions when the seat back is in a folded position. The platform is movable in at least two different directions between a plurality of different use positions. The platform is coupled to the seat back with a simple and effective support mechanism that includes at least one detachable member to provide at least one of the use positions. The platform and support mechanism are compactly arranged such that they are flush with the seat back when the seat back is in the upright position.

Although a specific component relationship is illustrated in the figures of this disclosure, the illustrations are not intended to limit this disclosure. In other words, the placement and orientation of the various components shown could vary within the scope of this disclosure. In addition, the various figures accompanying this disclosure are not necessarily to scale, and some features may be exaggerated or minimized to show certain details of a particular component.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. An apparatus, comprising:
   a seat back movable between an upright position and a folded position, wherein the seat back has an outermost external surface; and
   a platform coupled to the seat back with a support mechanism such that the platform is movable between a plurality of use positions when the seat back is in the folded position, and wherein the platform is generally flush with the outermost external surface of the seat back when the seatback is in the upright position, and wherein the support mechanism includes at least one member that is selectively detached from the platform and moved to a member stowed position to provide at least one of the plurality of use positions.

2. The apparatus according to claim 1, wherein the plurality of use positions includes at least a stowed position, a table position, and an upright position.

3. The apparatus according to claim 2, wherein the at least one member is detached from the platform when in the upright position.

4. The apparatus according to claim 3, wherein the seat back provides a seat back surface that is generally parallel to ground level when in the folded position, and wherein
   the platform is generally parallel to and fitted against the seat back surface when in the stowed position,
   the platform is generally parallel to and spaced apart from the seat back surface when in the table position, and
   the platform is oriented at a non-zero angle relative to the seat back surface when in the upright position.

5. An apparatus, comprising:
   a seat back movable between an upright position and a folded position, wherein the seat back provides a seat back surface that is generally parallel to ground level when in the folded position; and
   a platform coupled to the seat back with a support mechanism such that the platform is movable between a plurality of use positions when the seat back is in the folded position, wherein the plurality of use positions includes at least a stowed position, a table position, and an upright position, and wherein the platform includes at least a base portion and a flippable portion that pivots relative to the base portion, and wherein the plurality of use positions additionally includes at least a flip-up position where the flippable portion is pivoted upright relative to the base portion to provide a support stand, and wherein
   the platform is generally parallel to and fitted against the seat back surface when in the stowed position,
   the platform is generally parallel to and spaced apart from the seat back surface when in the table position, and
   the platform is oriented at a non-zero angle relative to the seat back surface when in the upright position; and
   wherein the support mechanism includes at least one member that is selectively detached from the platform and moved to a member stowed position to provide at least one of the plurality of use positions, and wherein the at least one member is detached from the platform when in the upright position.

6. The apparatus according to claim 5, wherein the flippable portion is selectively movable to the flip-up position at least when the seat is in the stowed or table position.

7. An apparatus, comprising:
   a seat back movable between an upright position and a folded position, wherein the seat back provides a seat back surface that is generally parallel to ground level when in the folded position;
   a platform coupled to the seat back with a support mechanism such that the platform is movable between a plurality of use positions when the seat back is in the folded position, wherein the plurality of use positions includes at least a stowed position, a table position, and an upright position, and wherein
   the platform is generally parallel to and fitted against the seat back surface when in the stowed position, the platform is generally parallel to and spaced apart from the seat back surface when in the table position, and the platform is oriented at a non-zero angle relative to the seat back surface when in the upright position;

wherein the support mechanism includes at least one member that is selectively detached from the platform and moved to a member stowed position to provide at least one of the plurality of use positions, wherein the at least one member is detached from the platform when in the upright position; and wherein the plurality of use positions additionally includes at least an extended storage position, wherein the at least one member is detached from the platform and the platform is pivoted beyond the upright position to the extended storage position.

8. An apparatus, comprising:

a seat back movable between an upright position and a folded position;

a platform coupled to the seat back with a support mechanism such that the platform is movable between a plurality of use positions when the seat back is in the folded position, and wherein the support mechanism includes at least one member that is selectively detached from the platform to provide at least one of the plurality of use positions;

wherein the plurality of use positions includes at least a stowed position, a table position, and an upright position;

wherein the at least one member is detached from the platform when in the upright position;

wherein the seat back provides a seat back surface that is generally parallel to ground level when in the folded position, and wherein the platform is generally parallel to and fitted against the seat back surface when in the stowed position, the platform is generally parallel to and spaced apart from the seat back surface when in the table position, and the platform is oriented at a non-zero angle relative to the seat back surface when in the upright position; and wherein the platform includes a first surface facing the seat back surface and a second surface opposite the first surface, and including at least one latch member on the first surface that selectively couples the at least one member to the platform.

9. The apparatus according to claim 8, wherein the at least one latch member is configured to additionally provide a retaining feature that can hold a bag or secure a moveable object when the platform is in the upright position.

10. An apparatus, comprising:

a seat back movable between an upright position and a folded position; and a platform coupled to the seat back with a support mechanism such that the platform is movable between a plurality of use positions when the seat back is in the folded position, and wherein the support mechanism includes at least one member that is selectively detached from the platform to provide at least one of the plurality of use positions; and wherein the support mechanism includes a first bar linkage that has one end pivotally connected to the seat back and an opposite end pivotally connected to the platform, and a second bar linkage that is separate from the first bar linkage, and has one end pivotally connected to the seat back and another end pivotally and detachably connected to the platform to comprise the at least one member that is detachable from the platform.

11. The apparatus according to claim 10, wherein the second bar linkage comprises a single bar having a U-shape or a C-shape.

12. The apparatus according to claim 10, wherein the second bar linkage is selectively detached from the platform to rest against the seat back while the first bar linkage remains attached to the platform to allow the platform to be pivoted forwardly about the opposite end of the first bar linkage to an upright position where the platform is oriented at a non-zero angle relative to the seat back when the seat back is in the folded position.

13. A method comprising:

providing a seat back movable between an upright position and a folded position;

coupling a platform to the seat back with a support mechanism such that the platform is movable between a plurality of use positions when the seat back is in the folded position; and selectively detaching at least one member of the support mechanism from the platform to provide at least one of the plurality of use positions; and wherein the support mechanism includes a first bar linkage and a second bar linkage that is separate from the first bar linkage, and including pivotally connecting one end of the first bar linkage to the seat back and pivotally connecting an opposite end of the first bar linkage to the platform, and pivotally connecting one end of the second bar linkage to the seat back and pivotally and detachably connecting an opposite end of the second bar linkage to the platform to comprise the at least one member that is detachable from the platform.

14. A method comprising:

providing a seat back movable between an upright position and a folded position, wherein the seat back provides a seat back surface that is generally parallel to ground level when in the folded position;

coupling a platform to the seat back with a support mechanism such that the platform is movable between a plurality of use positions when the seat back is in the folded position, wherein the plurality of use positions includes at least a stowed position, a table position, and an upright position, wherein the platform includes at least a base portion and a flippable portion that pivots relative to the base portion, and wherein the plurality of use positions additionally includes at least a flip-up position and/or an extended storage position;

selectively detaching at least one member of the support mechanism from the platform and moving the at least one member to a member stowed position to provide at least one of the plurality of use positions; and including fitting the platform against the seat back surface when in the stowed position such that the platform is generally parallel to the seat back surface, raising the platform away from the seat back surface when in the folded position such that the platform is generally parallel to and spaced apart from the seat back surface when in the table position, pivoting the platform relative to the seat back surface and detaching the at least one member from the platform such that the platform is oriented at a non-zero angle relative to the seat back surface when in the upright position, pivoting the flippable portion upright relative to the base portion to provide a support stand and achieve the flip-up position when in the stowed or table position, and/or detaching the at least one member from the platform and pivoting the platform beyond the upright position to the extended storage position.

15. A method comprising:
providing a seat back movable between an upright position and a folded position;
coupling a platform to the seat back with a support mechanism such that the platform is movable between a plurality of use positions when the seat back is in the folded position; and
selectively detaching at least one member of the support mechanism from the platform to provide at least one of the plurality of use positions; and
wherein the plurality of use positions includes at least a stowed position, a table position, and an upright position, and wherein the platform has a first surface that faces away from the seat back when in the stowed position and a second surface that faces opposite the first surface, and including
directly attaching the at least one member to the second surface to provide the table position, and
selectively detaching the at least one member from the platform and pivoting the platform in a forward direction to the upright position such that the second surface is oriented at a non-zero angle relative to the seat back when the seat back is in the folded position.

16. The method according to claim 15, wherein the plurality of use positions additionally includes at least an extended storage position, and including continuing to pivot the platform in the forward direction from the upright position to provide the extended use position where the second surface is generally parallel to and faces away from the seat back.

17. A method comprising:
providing a seat back movable between an upright position and a folded position;
coupling a platform to the seat back with a support mechanism such that the platform is movable between a plurality of use positions when the seat back is in the folded position; and selectively detaching at least one member of the support mechanism from the platform to provide at least one of the plurality of use positions; and
wherein the platform has a first surface that faces away from the seat back when in the stowed position and a second surface that faces opposite the first surface, and including providing at least one latch member on the second surface to which the at least one member is selectively attached, and including
providing the at least one latch member as a resilient gripper having a least one arm extending away from the second surface to provide an opening between the at least one arm and the platform, and
pressing the at least one member into the opening such that the at least one arm flexes outwardly of the second surface from an initial position and then returns to the initial position once the at least one member is fully received within the opening to securely hold the at least one member to the platform.

18. An apparatus, comprising:
a seat back movable between an upright position and a folded position; and
a platform coupled to the seat back with a support mechanism such that the platform is movable between a plurality of use positions when the seat back is in the folded position, and wherein the support mechanism includes at least one member that is selectively detached from the platform to provide at least one of the plurality of use positions;
wherein the plurality of use positions includes at least a stowed position, a table position, and an upright position; and
wherein the platform has a first surface that faces away from the seat back when in the stowed position and a second surface that faces opposite the first surface, and wherein the at least one member is directly attached to the second surface to provide the table position, and wherein the at least one member is selectively detachable from the platform such that the platform is pivoted in a forward direction to the upright position where the second surface is oriented at a non-zero angle relative to the seat back when the seat back is in the folded position.

19. The apparatus according to claim 18, wherein the plurality of use positions additionally includes at least an extended storage position, and wherein the platform is configured to pivot in the forward direction from the upright position to provide the extended use position where the second surface is generally parallel to and faces away from the seat back.

20. The apparatus according to claim 18, including at least one latch member on the second surface to which the at least one member is selectively attached, and wherein the at least one latch member comprises a resilient gripper having a least one arm extending away from the second surface to provide an opening between the at least one arm and the platform, and wherein the at least one member is configured to be pressed into the opening such that the at least one arm flexes outwardly of the second surface from an initial position and then returns to the initial position once the at least one member is fully received within the opening to securely hold the at least one member to the platform.

21. An apparatus, comprising:
a seat back movable between an upright position and a folded position;
a platform coupled to the seat back with a support mechanism such that the platform is movable between a plurality of use positions when the seat back is in the folded position, and wherein the support mechanism includes at least one member that is selectively detached from the platform and moved to a member stowed position to provide at least one of the plurality of use positions; and
wherein the seat back includes a recessed area that receives the platform, the recessed area providing a seat back surface, and including a channel or groove provided within the seat back surface of the recessed area to receive the at least one member in the member stowed position such that the at least one member is generally flush with the seat back surface.

* * * * *